United States Patent
Ngo

[19]

[11] Patent Number: 6,128,146
[45] Date of Patent: Oct. 3, 2000

[54] UNDERSHOOT ACTIVE DAMPING CIRCUIT FOR WRITE DRIVERS

[75] Inventor: Tuan V. Ngo, Eden Prairie, Minn.

[73] Assignee: Lucent Technologies Inc., Murray Hill, N.J.

[21] Appl. No.: 09/168,495

[22] Filed: Oct. 8, 1998

Related U.S. Application Data

[60] Provisional application No. 60/091,963, Jul. 7, 1998.

[51] Int. Cl.[7] .................................. G11B 5/09; G11B 5/02
[52] U.S. Cl. .................................................. 360/46; 360/68
[58] Field of Search .................................. 360/46, 68

[56] References Cited

U.S. PATENT DOCUMENTS

| | | | |
|---|---|---|---|
| 5,333,081 | 7/1994 | Mitsui | 360/46 |
| 5,680,262 | 10/1997 | Yamagishi | 360/46 |
| 5,880,626 | 3/1999 | Dean | 360/46 |

*Primary Examiner*—W. Chris Kim
*Attorney, Agent, or Firm*—Kinney & Lange, P.A.

[57] ABSTRACT

A current driver for supplying write current to an inductive write head of a disk drive includes an H-switch and first and second damping circuits connected across the inductive head. Each damping circuit includes a first controlled resistor (such as a MOS transistor) connected across the head. A delay circuit is connected between a load terminal at one side of the head and the control terminal of the MOS transistor, and is responsive to a transient voltage at the load terminal to delay the transient voltage to the control terminal of the MOS transistor for a predetermined delay period. The MOS transistor is responsive to the delayed transient voltage to provide a predetermined electrical resistance across the head to dampen undershoot and ringing in the driver. The MOS transistor turns off when the voltage at the load terminals stabilizes, thereby removing the damping resistance from the circuit.

20 Claims, 2 Drawing Sheets

UNDERSHOOT ACTIVE DAMPING CIRCUIT FOR WRITE DRIVERS

CROSS-REFERENCE TO RELATED APPLICATION(S)

This application claims priority of Provisional Application Ser. No. 60/091,963 filed Jul. 7, 1998 for "Active Damping to Reduce Undershoot and Ringing of the Write Driver" by Tuan V. Ngo.

BACKGROUND OF THE INVENTION

This invention relates to damping undershoot in current write drivers in magnetic disk drives.

Data are recorded in magnetic media of magnetic disk drives by reversing current through a magnetic head to reverse magnetic flux generated by the head. The flux reversals are recorded as a "transition" in the recording medium adjacent the head, each transition representing binary data. As technology advances to increase the density of data recorded on the medium, the need arises for shorter current pulses, requiring quicker current rise and settling times at the current reversals.

Current reversal in a write head is effectuated by a current driver, operable to drive the current in opposite directions through the head. One common such driver is an H-switch, configured of four transistor switches operable in pairs such that two transistors conduct to direct write current in one direction through the head, and the other two transistors conduct to direct write current in the opposite direction through the head. The reversal of current through the head reversed flux generated by the head to record data in the magnetic medium.

The transistors of the H-switch exhibit parasitic capacitance that stores a charge during the steady-state condition of the H-switch. However, at the time of current reversal (current transition) by the H-switch, the parasitic capacitances charge or discharge, affecting the current waveform during transition. More particularly, discharge of the parasitic capacitance into the write current generates a current overshoot through the head. The overshoot generates a subsequent current undershoot condition, which generates ringing of the write current waveform until the write current ultimately settles to the steady-state condition.

While overshoot is not necessarily an adverse condition, as overshoot often leads to quicker rise times to the current transition, overshoot causes undershoot conditions which generates ringing and deteriorates the current waveform. The present invention is directed to an active damping circuit for damping current undershoot, thereby minimizing ringing.

BRIEF SUMMARY OF THE INVENTION

A current driver for supplying write current to an inductive write head of a disk drive includes an H-switch having first and second load terminals for connection to the inductive write head and first and second inputs for receiving a control signal. First and second damping circuit are connected across the inductive head. Each damping circuit includes a first controlled resistor (such as a MOS transistor) having its controlled terminals connected between the respective load terminal and one of the switching transistors on the opposite side of the head. A delay circuit is connected between the respective load terminal and the control terminal of the MOS transistor. The delay circuit is responsive to a transient voltage at the load terminal to delay the transient voltage to the control terminal of the MOS transistor for a predetermined delay period. The MOS transistor is responsive to the delayed transient voltage to provide a predetermined electrical resistance across the head. The MOS transistor turns off when the voltage at the load terminals stabilizes, thereby removing the damping resistance from the circuit.

In a preferred form of the circuit, the delay circuit is an RC circuit. In an optional form of the invention, a plurality MOS transistor form the resistor of the delay circuit, with a control terminal of each MOS being selectively operable to selective the value of the delay resistance, so that the delay period is approximately equal to a duration of the current overshoot, whereby the controlled resistor dampen current undershoot through the write head.

DETAILED DESCRIPTION

Figure 1:
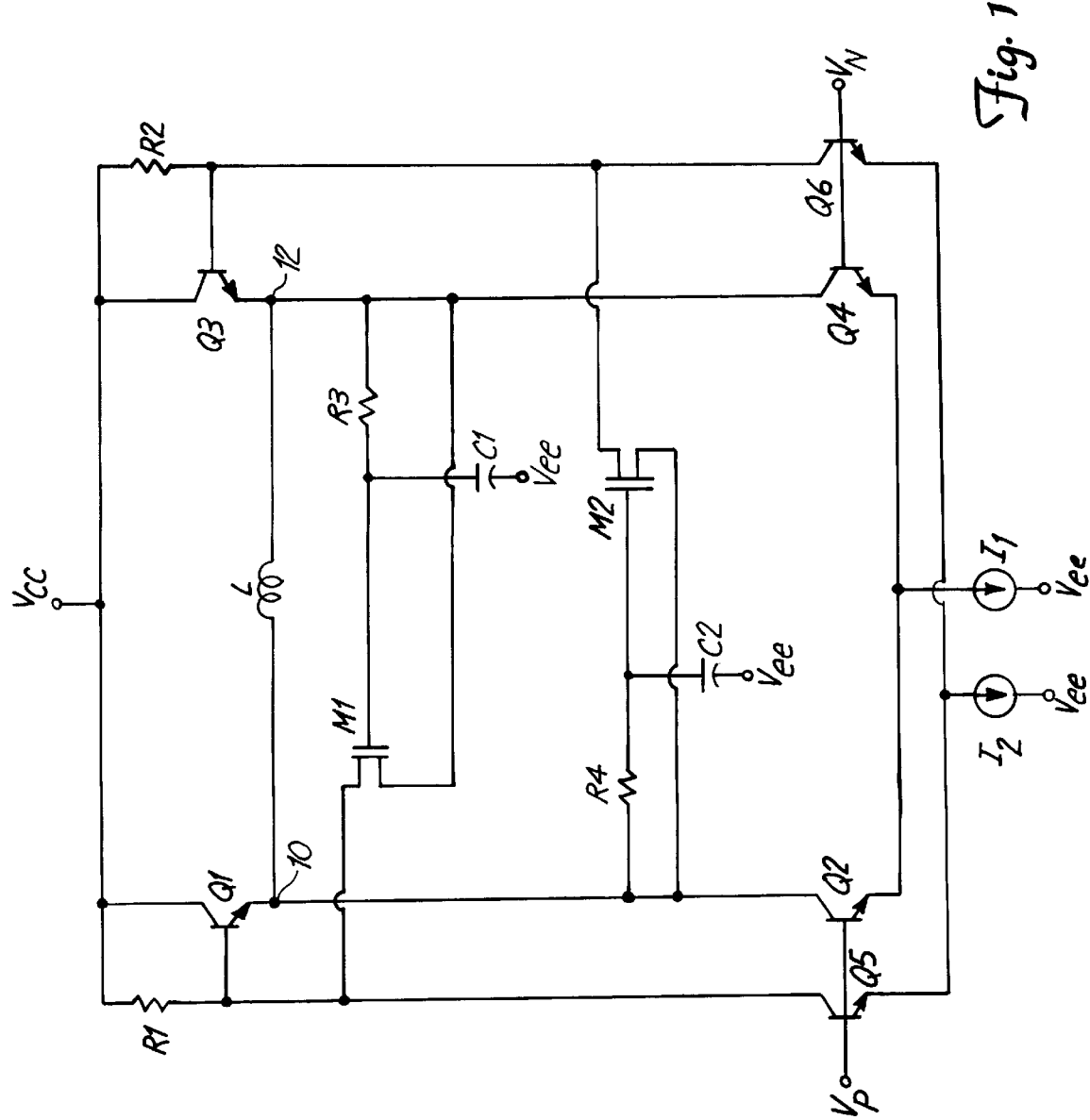
FIG. 1 is a circuit diagram of an active damping circuit in accordance with a preferred embodiment of the present invention.

FIG. 1 illustrates the circuit diagram of an H-switch composed of npn transistors Q1, Q2, Q3 and Q4, arranged to provide write current from write current source I1 through inductive load L. More particularly, the collectors of transistors Q1 and Q3 are connected positive voltage source Vcc, and the emitters of transistors Q1 and Q3 are connected to load terminals 10 and 12, for connection to opposite sides of inductive head L. The collectors of transistors Q2 and Q4 are connected to respective load terminals 10 and 12, and the emitters of transistors Q2 and Q4 are connected through write current source I1 to negative supply Vee, which may be ground.

An input circuit comprises input npn transistors Q5 and Q6 having their bases connected to respective inputs Vp and Vn and their emitters coupled through bias current source 12 to negative supply Vee. The collectors of transistors Q5 and Q6 are connected to respect to the bases of respective transistors Q1 and Q3. Pull-up resistors R1 and R2 are connected between the base and collector all respective transistors Q1 and Q3. The signals at Vp and Vn are complementary, so that when Vp is high, Vn is low, and vice versa.

The circuit thus far described is a reasonably conventional H-switch. In the steady-state mode, that is when no switching is occurring and the H-switch is providing steady state current in one direction between terminals 10 and 12, the voltage at terminals at 10 and 12 are each equal to Vcc−(Ib·R)−Vbe, where Ib is the current at the base of the respective transistor Q1 or Q3, R is the resistance value of the respective resistance R1 or R2, and Vbe is the voltage drop across the respective transistor Q1 or Q3. If transistors Q1 and Q3 are identical, and resistors R1 and R2 are of equal value, the voltage at terminals 10 and 12 will be equal. For a +5 volt supply at Vcc and ground at Vee, the voltage at terminals 10 and 12 is about +4 volts during steady-state conditions.

If transistors Q2 and Q3 are conducting so that write current I1 flows from terminal 10 through head L toward terminal 12, at a transition, the signal of Vp goes from high to low and a signal of Vn goes from low to high, turning off transistors Q2 and Q5 and turning on transistors Q4 and Q6. The conducting transistor Q6 will bring the voltage at the base of transistor Q3 down to near ground, turning off transistor Q3. Similarly, the off condition of transistor Q5 raises the voltage at the base of transistor Q1 rises to Vcc, turning on transistor Q1.

With transistor Q4 conducting, the voltage of terminal 12 initially drops from about +4 volts to near ground, discharging the parasitic capacitance of transistor Q3 into terminal 12. Likewise, due to the conducting condition of transistor Q1, at the voltage of terminal 10 rises from about +4 volts to Vcc (e.g., +5 volts), thereby charging the parasitic capacitance of transistor Q1. The voltage at terminals 10 and 12 will slowly reverse until both come to the stable voltage Vcc−(Ib·R)−Vbe, described above. While the voltage settles, the charging of the parasitic capacitance of transistor Q1 and discharging of the parasitic capacitance of transistor Q3 generates an overshoot condition in the write current, causing the write current to exceed the design level. Moreover, the parasitic capacitance of transistor Q1 discharges back to the steady-state level and parasitic capacitance of transistor Q3 charges back to the steady-state level that, in absence of the damping circuit of the present invention, generates a write current undershoot condition. This condition oscillates, with decreasing current amplitude, until the steady-state write current condition is reached and the voltage at terminals 10 and 12 are settled. Typically, the time for a current reversal to reach a steady-state condition is of the order to 4 to 5 nanoseconds, although about 1 to 2 nanosecond is required to effectuate current reversal to the current overshoot condition.

The present invention concerns the addition of a damping circuit composed of first and second PMOS devices M1 and M2 each having a control terminal connected through an RC time delay network to one of the load terminals, and having controlled terminals connected in parallel to head L. More particularly, the damping circuit includes a first PMOS device M1 having a control terminal connected through resistor R3 to terminal 12 and through capacitor C1 to negative supply Vee. PMOS device M1 has a first controlled terminal connected to terminal 12 and a second controlled terminal connected to the base of transistor Q1. Similarly, PMOS device M2 has a control terminal connected through resistor R4 to terminal 10, and connected through capacitor C2 to negative supply Vee. A first controlled terminal of PMOS M2 is connected to terminal 10, and the second controlled terminal of PMOS M2 is connected to the base of transistor Q3.

During the steady-state condition with a voltage of Vcc−(Ib·R)−Vbe (a logical high condition) at terminals 10 and 12, the logical high condition at the control terminals of PMOS devices M1 and M2 turn off both PMOS devices, thereby electrically removing them from the circuit. Upon a current transition, one of the load terminals (e.g., terminal 12) is driven to ground, imposing a logical low signal to the control terminal of PMOS device M1, thereby operating PMOS device M1. PMOS device M1 provides a resistance in parallel with the head L between terminal 12 and the base of transistor Q1. The parallel resistance dampens the write current. At the transition, the base of transistor Q1 is at a stable DC potential based on Vcc and the voltage divider established by resistor R1: Vb1=Vcc−(I2·R1).

Resistor R3 and capacitor C1 comprise an RC circuit to provide a time delay to delay operation of the PMOS device. The values of resistor R3 and/or capacitor C1 are selected so that the time delay provided by the RC circuit is approximately equivalent to the rise time, including overshoot, of the write current, namely about 1–2 nanoseconds. Hence, the RC time constant of the resistor and capacitor delays operation of the PMOS device until just before the write current would begin its undershoot and ringing mode. As a result, the undershoot and ringing are dampened by the resistance of PMOS M1. The damping operation of PMOS M1 continues until the voltage at terminal 12 settles at the steady-state condition (Vcc−(Ib·R)−Vbe) to return the control terminal of M1 to a logical high, thereby turning off M1. By turning off transistor M1, the damping resistance provided by PMOS M1 does not deteriorate the steady-state write current. Similarly, PMOS device M2 operates in the opposite mode to dampen current upon an opposite current transition.

Figure 2:
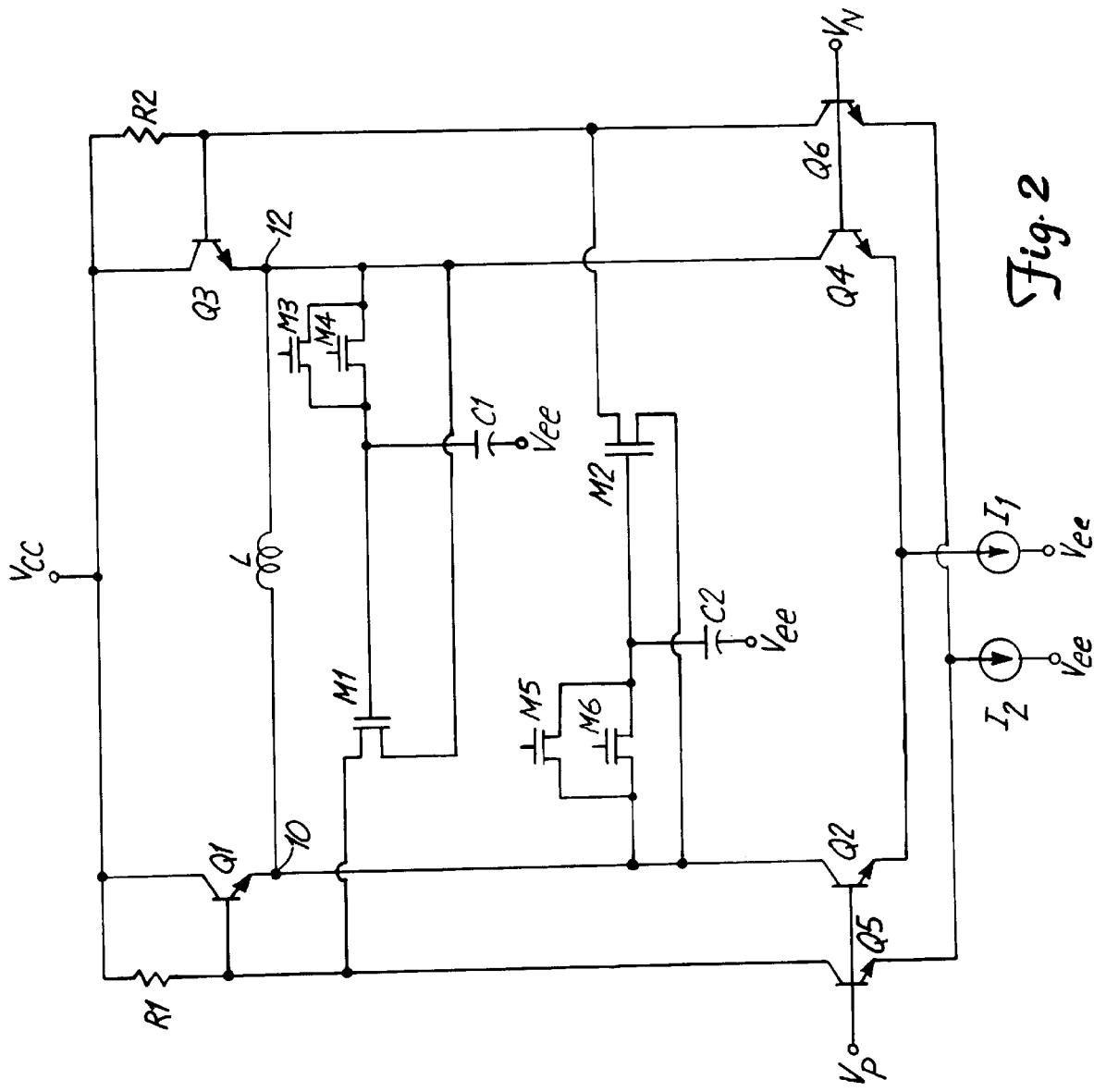
FIG. 2 is a circuit diagram illustrating a modification of the damping circuit in accordance with the present invention.

FIG. 2 illustrates a modification of the present invention in which resistors R3 and R4 are replaced by a plurality of parallel MOS devices M3 and M4 in the case of resistor R3, and M5 and M6 in the case of resistor R4. MOS devices M3–M6 are provided to provide different sizes of resistance to adjust the delay circuit associated with the respective PMOS device M1 or M2. The control terminals of MOS devices M3–M6 may be coupled to a program unit (not shown) to selectively operate the devices M3–M6 to select a resistance of desired size for the time delay. In this manner, the time delay may be tailored for the head L to which the circuit is connected.

The present invention thus provides a damping circuit for damping the undershoot and ringing of a write driver, thereby shortening the settling time of the write current transitions in a magnetic head. Although the present invention has been described with reference to preferred embodiments, workers skilled in the art will recognize that changes may be made in form and detail without departing from the spirit and scope of the invention.

What is claimed is:

1. A current driver for supplying write current to an inductive write head of a disk drive comprising:

first and second load terminals for connection to the inductive write head;

a first input for receiving a control signal and a second input for receiving complement of the control signal;

an H-switch comprising first, second, third and fourth transistors configured such that the control signal and the complement of the control signal operate the first and fourth transistors to conduction while operating the second and third transistors to non-conduction and to operate the first and fourth transistors to non-conduction while operating the second and third transistors to conduction, the first, second, third and fourth transistors generating a transient voltage which occurs at one of the first and second load terminals upon switching the transistors between their conductive and nonconductive states;

a first damping circuit comprising:

a first controlled resistor having a control terminal, a first controlled terminal connected to the first load terminal, and a second controlled terminal connected to the control terminal of the third transistor, the first controlled resistor being responsive to a transient voltage at its control terminal to provide a predetermined electrical resistance between the first load terminal and the control terminal of the third transistor, and a first delay circuit connected between the control terminal of the first controlled resistor and the first load terminal, the first delay circuit being responsive to the transient voltage at the first load terminal to delay the transient voltage to the control terminal of the first controlled resistor for a first predetermined delay period; and a second damping circuit comprising:
a second controlled resistor having a control terminal, a first controlled terminal connected to the second load terminal, and a second controlled terminal connected to the control terminal of the first transistor, the second controlled resistor being responsive to a transient voltage at its control terminal to provide a predetermined electrical resistance between the second load terminal and the control terminal of the first transistor, and a second delay circuit connected between the control terminal of the second controlled resistor and the second load terminal, the second delay circuit being responsive to the transient voltage at the second load terminal to delay the transient voltage to the control terminal of the second controlled resistor for a second predetermined delay period.

2. The write driver of claim 1, wherein the first and second controlled resistors each comprises an MOS transistor.

3. The write driver of claim 1, wherein the first and second delay circuits each comprises an RC circuit.

4. The write driver of claim 3, wherein each RC circuit comprises
a capacitor connected to the control terminal of the respective controlled resistor for connection to one of the supply voltages and
a delay resistor connected between the control terminal of the respective controlled resistor and the respective load terminal.

5. The write driver of claim 4, wherein the delay resistor comprises a plurality of MOS transistors each having a first controlled terminal connected to a control terminal of the respective controlled resistor, a second controlled terminal connected to the respective load terminal, and a control terminal arranged to be operated to selectively operate selected ones of the plurality of MOS transistors for the delay resistor.

6. The write driver of claim 4, wherein the first and second controlled resistors each comprises an MOS transistor.

7. The write driver of claim 6, wherein the delay resistor comprises a MOS transistor having a first controlled terminal connected to a control terminal of the MOS transistor forming the respective controlled resistor and a second controlled terminal connected to the respective load terminal.

8. The write driver of claim 6, wherein the delay resistor comprises a plurality of MOS transistors each having a first controlled terminal connected to a control terminal of the MOS transistor forming the respective controlled resistor, a second controlled terminal connected to the respective load terminal, and a control terminal arranged to be operated to selectively operate selected ones of the plurality of MOS transistors for the delay resistor.

9. The write driver of claim 1, wherein the first and second predetermined delay periods are equal.

10. The write driver of claim 9, wherein the transient voltage at the respective first and second load terminals generates a current overshoot through the write head, and the first and second delay periods are approximately equal to a duration of the current overshoot, whereby the controlled resistors dampen current undershoot through the write head.

11. A current driver for supplying write current to an inductive write head of a disk drive comprising:

first and second load terminals for connection to the inductive write head;

first and second supply terminals for connection to respective supplies of positive and negative voltages;

a first input for receiving a control signal and a second input for receiving complement of the control signal;

a write current source connected to at least one of the first and second supply terminals;

an H-switch comprising first, second, third and fourth transistors configured such that the first and third transistors have a first controlled terminal for connection to the positive voltage and the second and fourth transistors have a first controlled terminal for connection to the negative voltage, the first and second transistors having second controlled terminals connected to the first load terminal and the third and fourth transistors having second controlled terminals connected to the second load terminal, the first, second, third and fourth transistors having control terminals operated by the control signal and the complement of the control signal to operate the first and fourth transistors to conduction while operating the second and third transistors to non-conduction and to operate the first and fourth transistors to non-conduction while operating the second and third transistors to conduction, the first, second, third and fourth transistors being configured such that a transient voltage occurs at one of the first and second load terminals upon switching the transistors between their conductive and non-conductive states;

a first damping circuit comprising:
a first controlled resistor having a control terminal, a first controlled terminal connected to the first load terminal, and a second controlled terminal connected to the control terminal of the third or fourth transistor, the first controlled resistor being responsive to a transient voltage at its control terminal to provide a predetermined electrical resistance between the first load terminal and the control terminal of the respective third or fourth transistor, and a first delay circuit connected between the control terminal of the first controlled resistor and the first load terminal, the first delay circuit being responsive to the transient voltage at the first load terminal to delay the transient voltage to the control terminal of the first controlled resistor for a first predetermined delay period; and a second damping circuit comprising:
a second controlled resistor having a control terminal, a first controlled terminal connected to the second load terminal, and a second controlled terminal connected to the control terminal of the first or second transistor, the second controlled resistor being responsive to a transient voltage at its control terminal to provide a predetermined electrical resistance between the second load terminal and the control terminal of the respective first or second transistor, and a second delay circuit connected between the control terminal of the second controlled resistor and the second load terminal, the second delay circuit being responsive to the transient voltage at the second load terminal to delay the transient voltage to the control terminal of the second controlled resistor for a second predetermined delay period.

12. The write driver of claim 11, including first and second input circuits comprising:

fifth and sixth transistors having control terminals connected to respective first and second inputs, first controlled terminals connected to the control terminals of the respective first and third transistors, and second controlled terminals connected together for connection to the supply of negative voltage, and first and second pull-up resistors connected between the control terminal and the first controlled terminal of the respective first and third transistors.

13. The write driver of claim 11, wherein the first and second controlled resistors each comprises an MOS transistor.

14. The write driver of claim 11, wherein the first and second delay circuits each comprises an RC circuit.

15. The write driver of claim 14, wherein each RC circuit comprises a capacitor connected to the control terminal of the respective controlled resistor for connection to one of the supply voltages and a delay resistor connected between the control terminal of the respective controlled resistor and the respective load terminal.

16. The write driver of claim 15, wherein the delay resistor comprises a plurality of MOS transistors each having a first controlled terminal connected to a control terminal of the respective controlled resistor, a second controlled terminal connected to the respective load terminal, and a control terminal arranged to be operated to selectively operate selected ones of the plurality of MOS transistors for the delay resistor.

17. The write driver of claim 15, wherein the first and second controlled resistors each comprises an MOS transistor.

18. The write driver of claim 17, wherein the delay resistor comprises a plurality of MOS transistors each having a first controlled terminal connected to a control terminal of the MOS transistor forming the respective controlled resistor, a second controlled terminal connected to the respective load terminal, and a control terminal arranged to be operated to selectively operate selected ones of the plurality of MOS transistors for the delay resistor.

19. The write driver of claim 11, wherein the first and second predetermined delay periods are equal.

20. The write driver of claim 19, wherein the transient voltage at the respective first and second load terminals generates a current overshoot through the write head, and the first and second delay periods are approximately equal to a duration of the current overshoot, whereby the controlled resistors dampen current undershoot through the write head.

* * * * *